United States Patent [19]
Keller

[11] 3,729,179
[45] Apr. 24, 1973

[54] APPARATUS FOR LIQUID AND VAPOR OR GAS MASS TRANSFER

[75] Inventor: George J. Keller, Arcadia, Calif.

[73] Assignee: Fractionation Research, Inc., Bartlesville, Okla.

[22] Filed: Sept. 23, 1970

[21] Appl. No.: 74,771

[52] U.S. Cl........261/114 R, 261/114 VT, 261/114 A
[51] Int. Cl................................................B01f 3/04
[58] Field of Search......................261/114 R, 114 A, 261/114 VT, 114 JP; 202/158

[56] References Cited

UNITED STATES PATENTS

| | | | |
|---|---|---|---|
| 1,748,409 | 2/1930 | Campbell | 202/158 |
| 2,973,189 | 2/1961 | Chu | 261/114 R |
| 2,787,453 | 4/1957 | Hibshman et al. | 261/114 R |
| 3,362,696 | 1/1968 | Vaughan | 261/114 R |

FOREIGN PATENTS OR APPLICATIONS

| | | | |
|---|---|---|---|
| 901,917 | 4/1945 | France | 202/158 |
| 839,694 | 4/1939 | France | 261/114 R |
| 945,844 | 1/1964 | Great Britain | 261/114 R |
| 1,052,379 | 3/1959 | Germany | 202/158 |

Primary Examiner—Tim R. Miles
Attorney—Philip Subkow and Kendrick, Subkow & Kriegel

[57] ABSTRACT

This invention relates to apparatus for liquid and vapor or gas mass transfer on trays and to trays wherein the flow of liquid across the tray from the inlet to the outlet is substantially plug flow.

5 Claims, 25 Drawing Figures

Patented April 24, 1973 3,729,179

INVENTOR
GEORGE J. KELLER
BY Philip Subkow
KENDRICK, SUBKOW & KRIEGEL

ATTORNEYS

INVENTOR
GEORGE J. KELLER
BY
KENDRICK, SUBKOW & KRIEGEL

ATTORNEYS

RESIDENCE TIME

MOL PERCENT CYCLOHEXANE

Fig. 10.

MOL PERCENT CYCLOHEXANE

INVENTOR
GEORGE J. KELLER
BY
KENDRICK, SUBKOW & KRIEGEL

ATTORNEYS

Patented April 24, 1973 3,729,179

INVENTOR
GEORGE J. KEELER
BY Philip Subkow
KENDRICK, SUBKOW & KRIEGEL

ATTORNEYS

FIG. 21.

APPARATUS FOR LIQUID AND VAPOR OR GAS MASS TRANSFER

BACKGROUND OF THE INVENTION

This invention relates to improvements in vapor liquid contact trays such as are employed in fractionating towers and absorption towers for separation of vapors, gases and liquids into components of different volatilities or vapor pressure.

Trays employing downcomers and weirs are well known in this art and have been widely used. They are in general composed of a plate or sheet of metal with a drilled or punched perforated section or sections with and without bubble caps or valves known as the bubbling area, a section or sections of the plate being unperforated and positioned at one or both sides of the perforated section or between perforated sections, known as donwcomer seal area, and another section or sections positioned on one or both sides or between perforated sections, being open with vertical baffles extending above the plate in the form of a weir or weirs and depending from the plate in the form of a downcomer or downcomers. Liquid depositing from an upper tray onto the downcomer seal area flows over the perforated section or sections and over the weir or weirs through the downcomer to a lower plate.

It will be helpful to refer to the drawing of which

Figure 24:
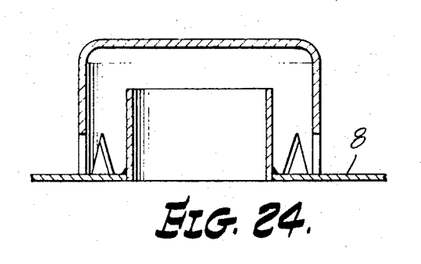
FIG. 24 is a schematic view of the bubble cap, such as may be used with a tray of my invention.
Figure 25:
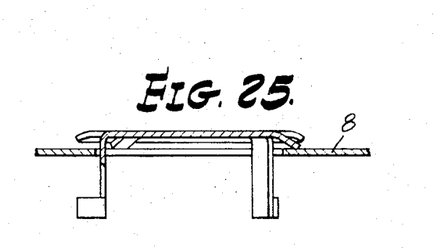
FIG. 25 is one of the valves which may be used with a tray of my invention.

As shown in FIGS. 1 to 5, the circular fractionator tower 1 carries a plurality of superposed trays. Each tray shown in FIGS. 1 to 5 has a discharge outlet known as a "downcomer" 3 in the form of an open area provided with a chordal baffle plate 4, whose depending leg forms the downcomer to carry the overflow from the upper tray to the downcomer seal section 5 of the lower tray. The space between the end of the downcomer baffle plate 4 and the seal section forms a submerged orifice. The upstanding section of the baffle 4 forms a weir 7. Between the weir 7, whose height is measured from the surface of the plate to the top of the baffle, and the receiving section 5 is the perforated area of the tray which forms the bubble area of the plate. When only open holes are provided, the tray is termed a sieve tray. (See FIGS. 1 to 5). Instead of open holes, the holes are in the form of covered short tubes known as bubble caps. See FIG. 24. Or, are provided with valves. See FIG. 25. All this is conventional and are widely used. The downcomer plate 4 clears the real section 5 and forms a submerged orifice through which the liquid flows from the downcomer into the bubbling area.

It has been a common experience in this art that methods of design for such trays are unreliable. The actual capacity of towers employing such trays may be different from the design efficiency by as much as several hundred percent. Thus, towers either too larger or too small, with more or less trays than necessary, may be obtained for the service for which the towers were designed. The designer in prior art depended on generous safety factors to cover the lack of precise knowledge of the factors influencing his design. The art had to depend on trial and error and on accidental and unappreciated happy circumstances in building tray towers for fractionating towers, absorption towers, and other towers employing trays in vapor or gas and liquid contact systems for the fractionation of the liquid or vapor or gas.

This invention arises from certain discoveries which have been made which are surprising in that they are directly contrary to certain widely accepted standards and principles which have long been employed in this art. As a result of my discoveries it is possible to design trays so that the design capacity and estimated efficiency is much closer to the achieved efficiency and capacity. The total tray surface required to separate a given composition at a given rate employing trays of my invention may be much less than that required from trays previously employed for like services. In addition this is achieved without sacrifice of flexibility so that the towers may be employed over a wide range of load without impairment of their fractionation efficiency.

The present state of the art relating to the design and construction of trays assumes the presence of two separate processes in the liquid on the tray to wit: eddy diffusion and convection. The residence time and concentration profiles and the liquid on the tray depends on boundary conditions and variations in velocity and the eddy diffusion process through three dimensional space occupied by the liquid. It has long been recognized that the problem of determining the movement of the liquid on the tray is so complex as to defy analysis. Therefore, in designing and constructing trays certain simplifying assumptions have been made.

1. That the eddy diffusion process (that is the local mixing due to turbulence) is the same throughout the whole of the liquid volume on the tray.

2. That the velocity of the liquid at various portions of the tray is independent of location of the portion on the tray.

Thus, designers have assumed that the tray fluid dynamics are characterized by uniform one directional i.e. plug flow from the inlet to the outlet of the tray and that the concentration profiles and the residence time profiles are uniform across the tray at all prositions equally measured from the downcomer. In the alternative, it is assumed that the liquid on the tray is completely mixed i.e. of uniform composition. The assumption is that the composition is the same at all parts of the tray.

That such conditions do not occur on practical trays and that, therefore, the design tray efficiencies are not realized practically has long been recognized, but no solution which will produce the desirable ideal flow patterns have been found.

As a result of extensive investigations of commercial size trays, I have discovered the cause of the non idealities in the fluid flow patterns of liquid on trays and have found the solution whereby the stream flow patterns required to produce the highest efficiencies of trays may be achieved.

In trays operating with downcomers in circular towers with or without weirs, I have discovered that the tray is separated into hydraulically separate regions. There is a central region extending from the submerged orifice at the inlet downcomer to the outflow region into the outlet downcomer. The central region is one of relatively high velocity in the direction of the outlet and reaches the outlet downcomer with a minimum residence time and with the least vapor to liquid mass transfer. Adjacent to the central stream and on both sides thereof are streams in which back hydraulic force due to a reflection at the weir which couples with the central stream and which may even cause a circulation from the weir towards the tray inlet downcomer. This back circulation may also include vortexes in which dead spots occur in which substantially no transverse liquid mass movement towards or away from the outlet downcomer occurs. At these regions of the tray the liquid has a residence time in excess of the residence time of the liquid which traverses the central section of the tray in its passage from the downcomer to the weir. Additionally, the liquid in these regions encounters an increased liquid to vapor mass transfer as compared to that at the central section of the stream at the weir.

The result of this discovery as to the configuration of the liquid streams on trays is that each of the assumptions upon which modern design and construction of trays are based are false.

Figure 1:
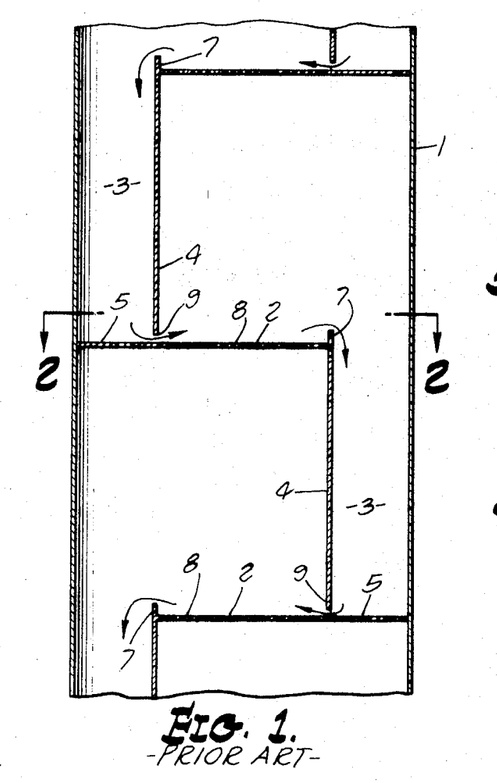
FIG. 1 shows a schematic view of a vertical section of a tower with a single pass tray.
Figure 2:
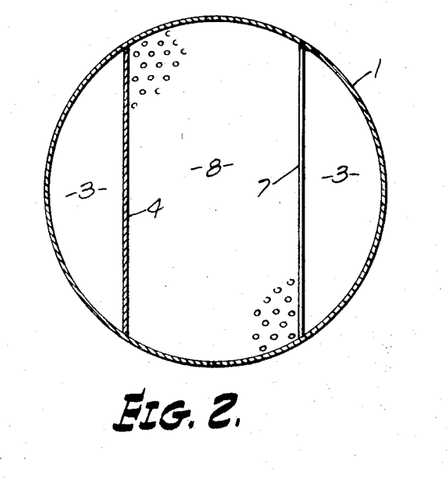
FIG. 2 is a section on Line 2—2 of FIG. 1.
Figure 3:
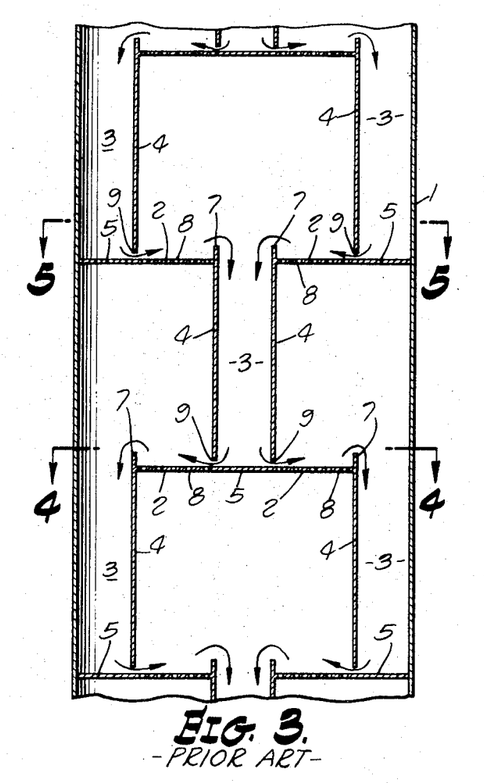
FIG. 3 is a schematic view of a vertical section of a tower with two pass trays.
Figure 4:
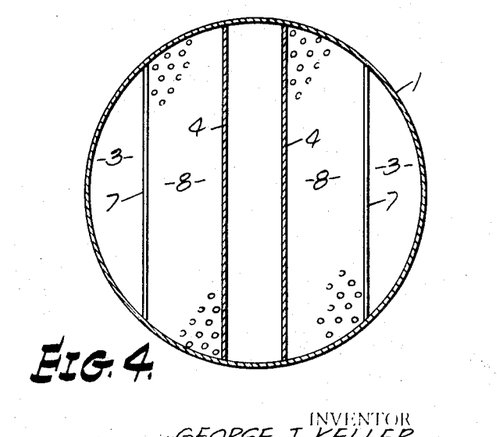
FIG. 4 is a section on Line 4—4 of FIG. 3.
Figures 5, 18, 19, 20:
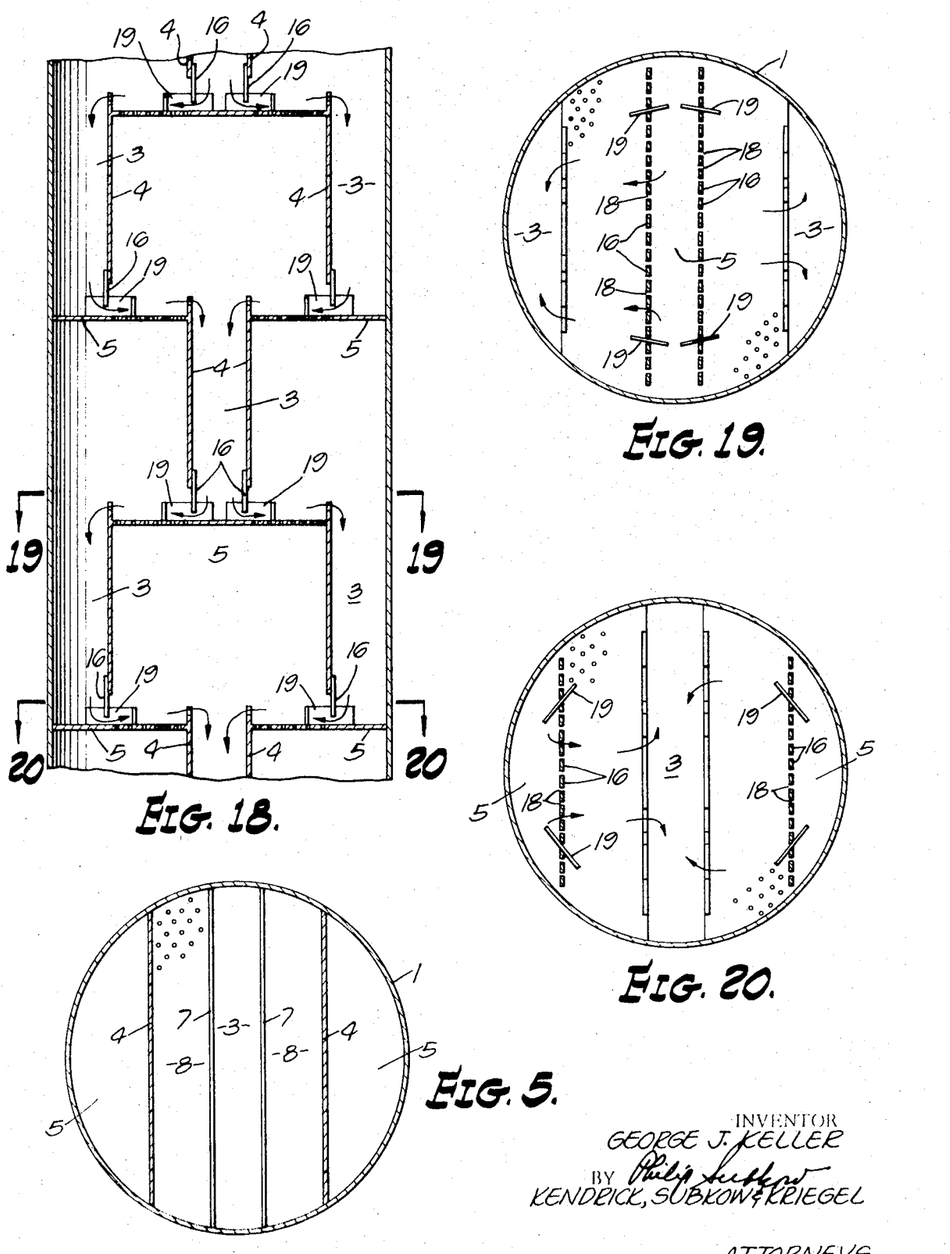
FIG. 5 is a section on Line 5—5 of FIG. 3.
FIG. 18 is a vertical section of my invention applied to a two pass tray.
FIG. 19 is a section taken on Line 19—19 of FIG. 18.
FIG. 20 is a section taken on Line 20—20 of FIG. 18.
Figure 6:
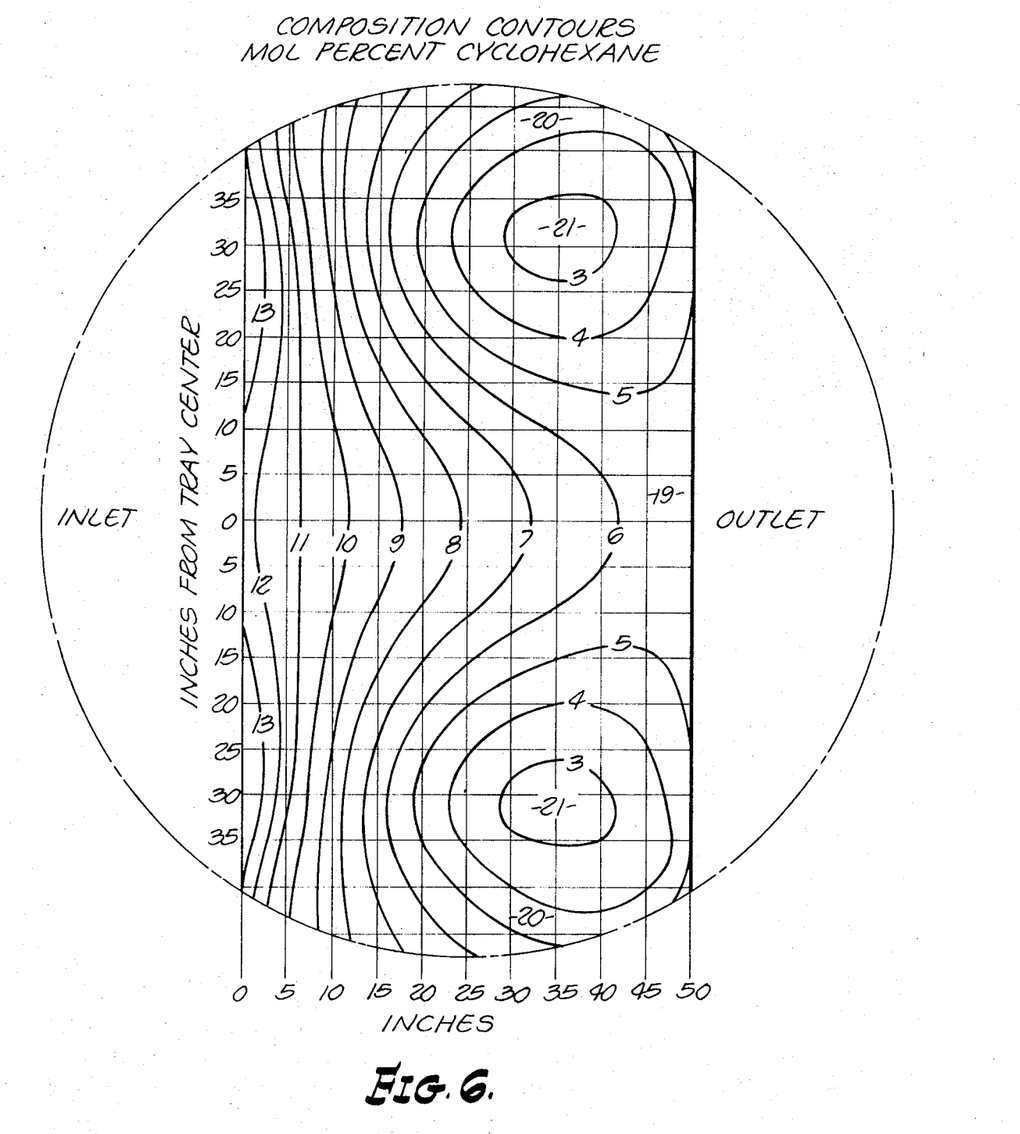
Figure 7:
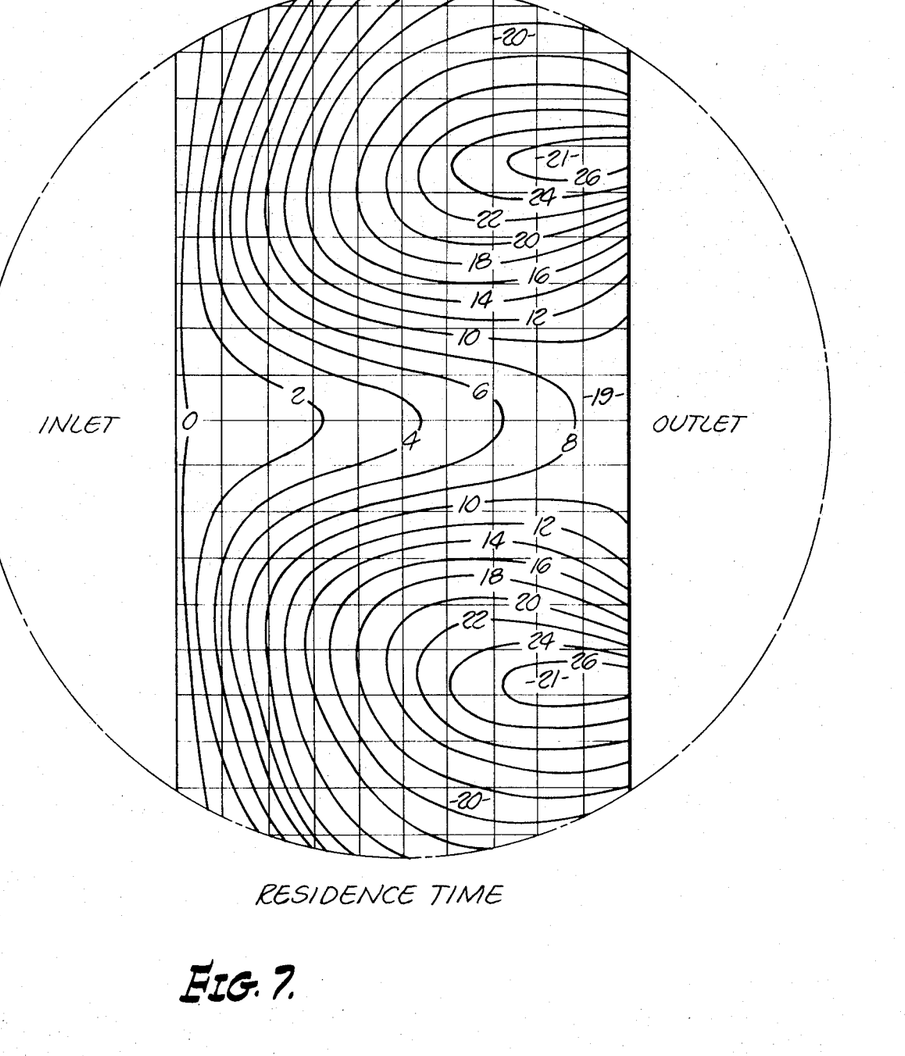
Figure 8:
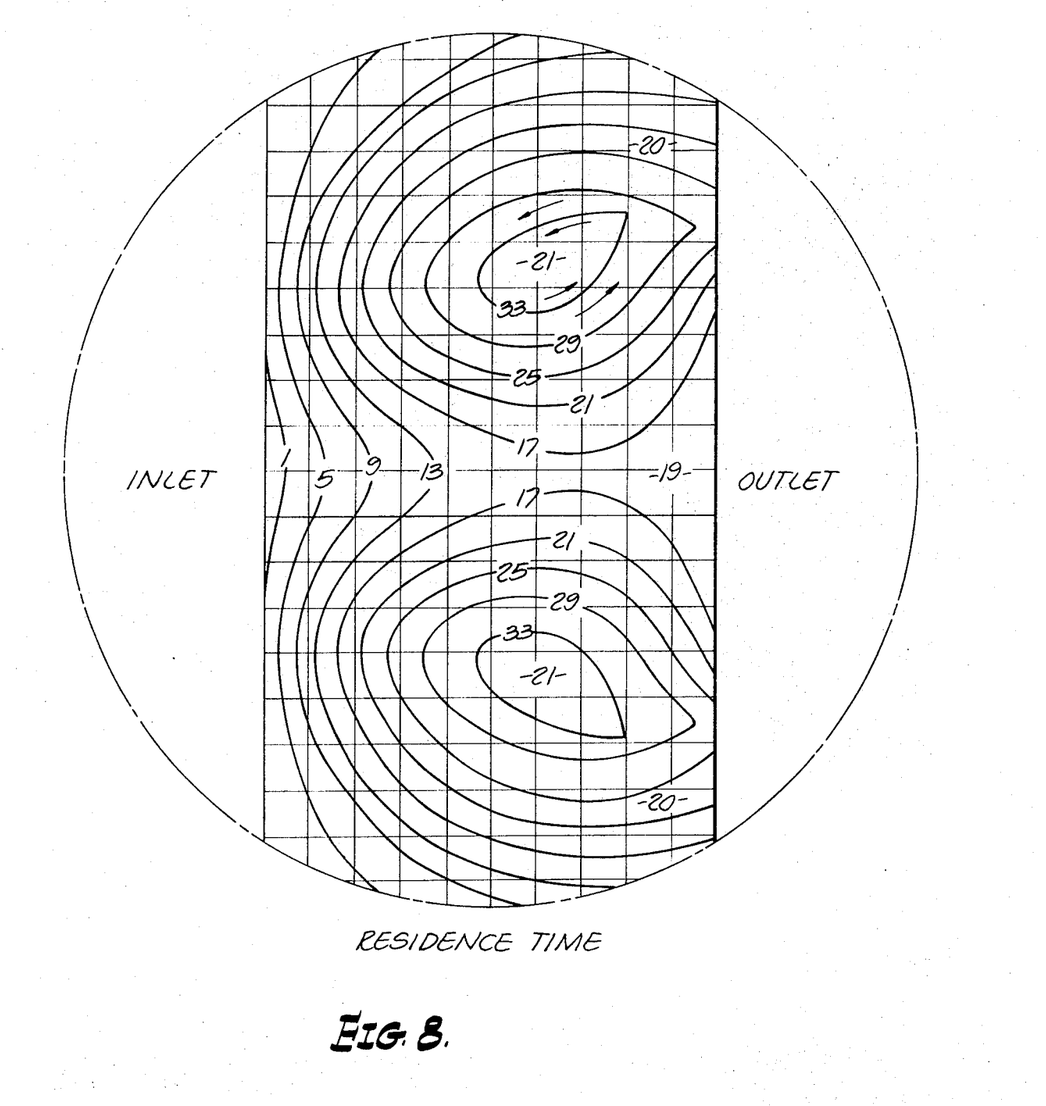

FIGS. 6, 7 and 8 illustrate an observed flow pattern in a signle pass tray.

Figure 9:
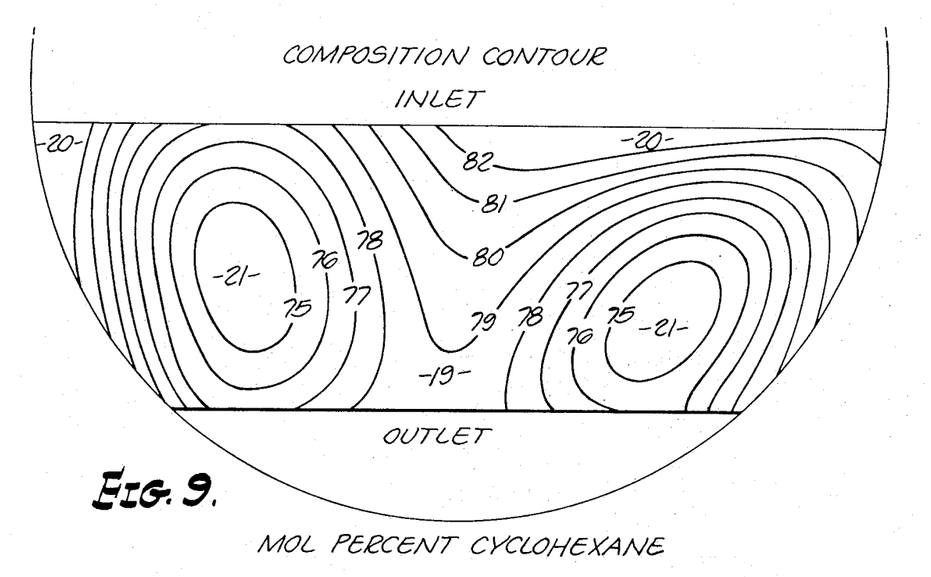
Figure 10:
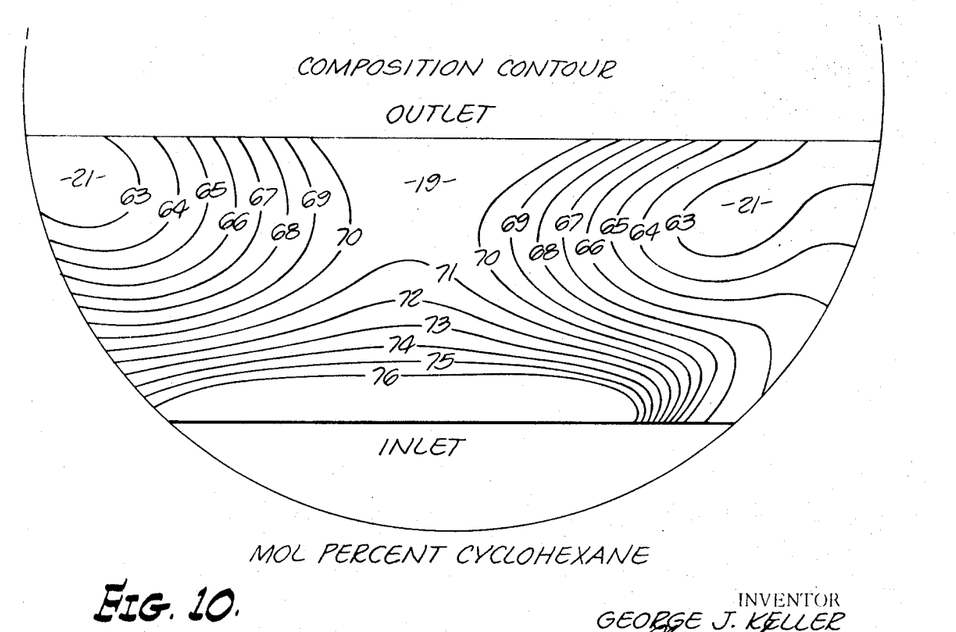

FIGS. 9 and 10 illustrate observed flow patterns in two pass trays.

In FIGS. 6, 9 and 10 the contour lines are of equal molar composition, i.e., the molar fraction of cyclohexane in a mixture of cyclohexane and toluene. The number at each contour line is the molar percent of cyclohexane along the contour line. This data was obtained by sampling the tray at suitably arranged sampling stations.

It will be observed that the tray in FIGS. 6, 9 and 10 each have three regions. In FIG. 6 there is a central region 19 spanning about 20 inches at the center of the 8 foot tray where the main fractionating function occurs resulting in a change of about 60 percent in the composition. This region covering about 20 to about 35 percent of the tray area at the center of the tray is herein termed the central region. The inlet has about 13 molar percent cyclohexane and the outlet about 5 percent.

The wall region has a stream 20 which undergoes more extensive mass transfer than the central region 19, the exchange ending in a concentration of 5 mol percent. This region covers about 10 to about 20 percent of the tray area adjacent the wall on each side of the tray, herein referred to as the wall region. The intermediate region 21 is relatively stagnant and has encountered an exchange which is more than about twice that of the central region. The intermediate region between the wall region and the central region covering about 10 to about 30 percent of the tray area at each side of the tray is herein termed the intermediate region of the tray.

It is to be recognized that the FIG. 6 illustrates the concentration profiles taken at a given moment during the fractionation process and indicates that there are areas which do not participate in the mass transfer process occurring on the tray to the extent of other regions. They form in what are essentially dead spots in that the liquid in these areas have substantially no or very low translational velocity towards the weir compared with other portions of the tray.

This is further illustrated by FIGS. 7 and 8. The contour lines are isochrons, that is they are lines of equal residence time. The data was obtained employing dye tracer technique. See "Liquid Mixing in Distillation Columns" M. Sakata, Chemical Engineering Progress Vol. 62 No. 11 pages 93–103. While this method of detection is not part of this invention, the following illustrates the tracer technique which was used.

Figure 11:
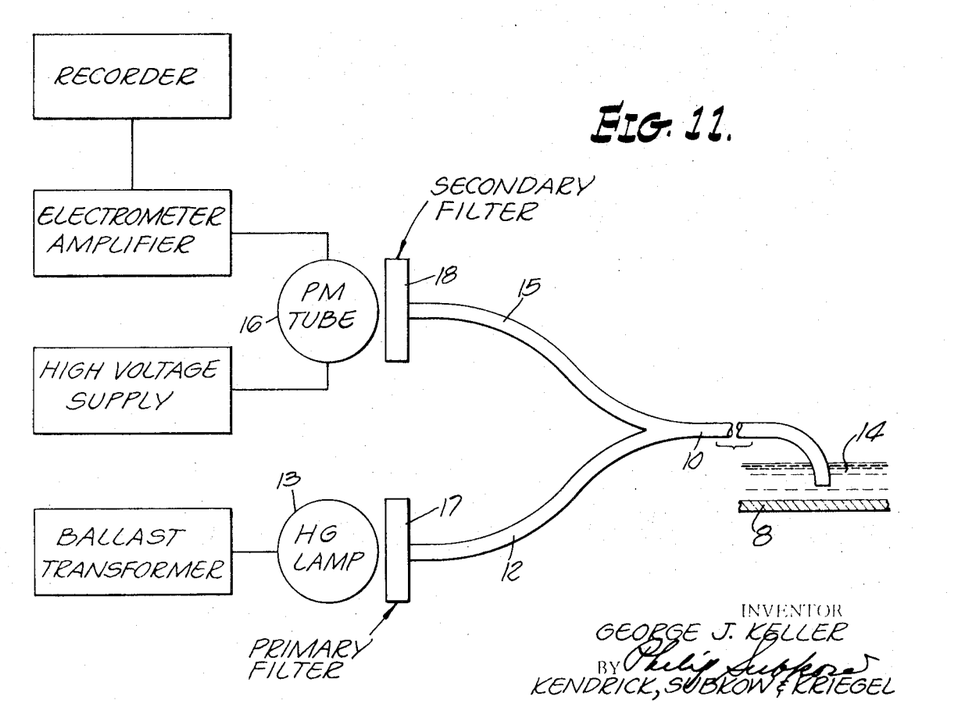

The method is based on the use of fiber optic probes to detect the presence of a fluorescent tracer with a very rapid activation and decay time. The schema for the method is shown in FIG. 11. The fiber optic probe consists of a bundle 10 of very small randomly oriented glass fibers which have a refractive index of 1.62. Each fiber is coated with a layer of glass with a refractive index 1.52 making the individual glass fibers totally internally reflective. At one end of the probe the fibers are divided into two separate bundles to form a bifurcation. The end 11 is mounted in the perforated area 8. Several such stations are so mounted in order to obtain the desired contours.

One limb 12 of this bifurcation is used as a pathway to conduct light from a mercury lamp light source 13 into the liquid. The light leaving the end of the light pipe illuminates a small volume of liquid 14, exciting any dye tracer which may be present causing it to fluoresce. A portion of this fluoresced light is then conducted up the second set of fibers 15, through the second limb of the bifurcation to a photomultiplier tube 16. The primary 17 and secondary filters 18 are complementary and were selected to prevent the excitation light from reaching the photomultiplier tube. There are no electrical connections to the fiber optic probe. The excitation light source and the detectors are located outside the column.

A high pressure bottle not shown was filled with a 10 gm/L solution of Rhodamine-B and pressurized to 100 PSIG with nitrogen. The dye was injected by opening an air operated motor valve between the dye bottle and the column and the entire contents of the bottle were forced into the downcomer on the top tray. The probes were mounted on the third tray from the top.

This pattern, see FIG. 7, developed in a single pass tray shown that the regions on each side of the central region consists of three distinct zones. The traverse time in seconds given by the numbers at the isochrons indicate that the stream at the central section covering 20 inches has the highest average velocity in the direction of the outlet being at the maximum at the center 19 of the tray, lowest in zone 21 and of intermediate velocity in zone 20 along the wall.

Whereas it has taken 8 seconds for all the liquid at the center to travel 44 inches towards the weir, at a distance of 28 inches to the left or right of the center, it has taken the fluid 27 seconds to travel the same vertical distance of 44 inches. At about 20 inches from the center to the right or left thereof it has taken about 19 seconds to travel the 44 inches and adjacent the walls, i.e., 43 inches from the center to the right or left, it has taken about 16 seconds to travel the 44 inches. In the region between about 20 and 30 inches from the center, the residence times are at a maximum, that is that the average velocity is at a minimum picking up more as one moves to the center and picking up less as one moves to the wall.

The flow pattern in a single pass sieve tray occurs also in the two pass trays. FIGS. 9 and 10 show that the regions of flow are similar to those in the single pass tray. These figures show that concentration contours for the separation of cyclohexane from the mixture with toluene. There also is a central corridor which has the highest fluid flow velocity. The flow at the wall is at the lower translational velocity and intermediate thereto is a stream of relatively slow velocity. The composition containing the lowest percent of cyclohexane in the intermediate corridor is due to the highest residence time.

The pattern of FIG. 8 is another flow pattern on the same type tray at a somewhat different flow rate. The isochrons show the same three zones each, i.e., a central zone 19 of relatively low residence time, i.e., highest translational velocity with zone 20 adjacent the wall of lower translational velocity and an intermediate region.

In the case of FIG. 8, the flow pattern was such that the dead spot 21 was sufficiently far from the weir to permit the establishment of closed isochrons resulting from the establishment of a vortex as indicated by the arrows in FIG. 8.

Similar flow patterns are illustrated in FIGS. 6 and 9.

In the case of the flow patterns of FIGS. 7 and 10, the flow rate was such that closed contour lines were not observed by the technique employed, and while retrograde flow, resulting in vortices were not observed, the zonal flow pattern described above appeared.

Figure 15:
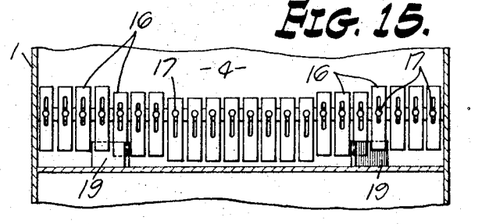
FIG. 15 is a fragmentary detail of a portion of the structure shown on FIG. 14.
Figure 16:
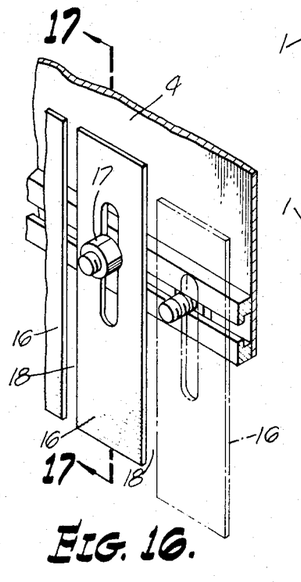
FIG. 16 is a fragmentary view of a detail of FIG. 12.
Figure 17:
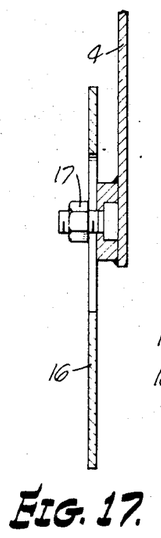
FIG. 17 is a vertical section on Line 17—17 of FIG. 16.

It is significant to note that the above flow patterns are characteristic of the conventional trays and are substantially independent of vapor or gas velocity and liquid flow rates on the tray. It appears characteristic of the distribution of fluid momentum in the plane of the plate arising from the coupling effect of the geometries of submerged orifice, the weir and the circular wall. The flow patterns are also from of obstructions to flow arising from the use in the tray of bubble caps such as shown in FIG. 15 and valves such as shown in FIG. 16 on the tray.

The result of this discovery is that in a conventional tray the tray is not completely mixed. The liquid on the tray is not of identical composition throughout the tray. The velocity of the liquid is not independent of location. The flow is not a plug flow, since the residence time and concentration profile are not uniform across the tray, that is, that at all equally spaced positions measures front the inlet, there is a variation in composition and residence time.

The assumptions on which designs of and constructions of trays have been based in the prior art are not factually correct.

SUMMARY OF THE INVENTION

Having discovered the nature of the non ideality of the fluid flow which results in the failure to attain the desired efficiencies, I have been able to devise tray designs which overcome the inherent disadvantages of the current art trays, and thus I am able to construct and operate said trays, bubble cap trays and valve trays and to conduct vapor liquid interchange under such conditions that approach ideal design conditions and which will attain the highest tray efficiencies.

As a result of my invention I am able to operate vapor liquid contact systems employing trays by proportioning and controlling the volumetric flow of the liquid on the tray so that throughout the major portion of the tray, approaching the outlet, the residence time on the tray is substantially constant at positions of equal distance from the inlet submerged orifice.

I have been able to design and construct trays, such that the attained tray efficiencies approximate theoretical tray efficiencies.

I accomplished this improvement over conventional trays by employing one or more of the following features: (1) Increasing the hydraulic driving force at the submerged inlet orifice adjacent the wall, relative to that at the central region by adjusting the relative hydraulic driving force in the wall region and intermediate region and at the central region; (2) by reducing the hydraulic jump at the inlet submerged orifice; and (3) by adjusting the reflection at the central zone of the discharge from the tray and the relative height of the liquid above the tray at the wall region, central region, and intermediate region.

While each of these expedients are of help in attaining the desired objective, I find that a further improvement is made by directing the flow from the downcomer into the region adjacent the wall and reducing the expansion of the fluid at this point.

I obtained these improvements by arranging the submerged orifice at the inlet in the central corridor to be of smaller vertical dimension as compared to that of the orifice at the wall section. The height of the orifice adjacent the wall is substantially greater as compared to that at the central corridor. I may preferably also provide submerged spaced auxiliary openings which are distributed along the downcomer and which extend to the region at or adjacent the ends of the inlet downcomer.

In addition, I have provided guide vanes extending into the downcomer at the downcomer's seal area and extending substantially parallel to a tangent plane to the wall where the downcomer baffle meets the wall. I may or may not use a weir depending on the service to be met as in the prior art. Where I use a weir I prefer to shape the weir so that the areas adjacent the wall and in the center of the weir are lower than the intermediate portions. I prefer to employ a weir as formed in the aforesaid manner and also the downcomer submerged orifice as described above and also vanes as described above. I have found that as a result non idealities in fluid flow patterns described above are avoided and that plug flow on the tray is achieved. In such case, design assumptions are realized and tray efficiencies approach the theoretical design efficiencies.

This is particularly so in vapor or gas-liquid contact systems in which the mass transfer rate controlling process is the rate of diffusion of the material from the vapor-liquid interface into the body of the liquid. In such case the prior art attained tray efficiencies are low, characteristically less than 50 percent of the theoretical, as for example, when conventional trays are employed in absorption system. However, my invention will also be useful in trays where the rate controlling process is a vapor or gas-liquid mass transfer, as in the case in distillation and frictionation columns where characteristically higher tray efficiencies are attained.

It is an object of my invention to operate a liquid vapor or gas, mass transfer process, on a liquid and gas or vapor contact tray which comprises passing the liquid from the inlet downcomer submerged orifice in a stream which is substantially in plug flow across the tray throughout the major portion of the tray adjacent the outlet downcomer.

It is, therefore, one of the objects of my invention to design and construct trays in which the liquid flow pattern is in substantial effect, that characteristic in plug flow.

It is a further object of my invention to design and build trays employing such flow patterns for use in processes in which the mass transfer rate controlling process is the of diffusion of the material from the vapor-liquid interface into the body of the liquid.

It is an object of my invention to operate liquid and vapor or gas contact processes on a sieve, bubble cap or valve tray in which liquid flows through a submerged orifice at the inlet downcomer over the bubbling area of the tray to an outlet downcomer, which process of liquid and vapor or gas contact comprises establishing the relative hydraulic driving force at the central region and the wall region and the intermediate region of the tray, whereby the hydraulic driving force at the central region relative the wall region and the hydraulic driving force at the wall region relative the intermediate region coupling with the reflection pressure at the central region adjacent the weir produces a flowing stream of liquid in the major portion of the tray adjacent the outlet which is substantially in plug flow across the tray in said portion of the tray.

It is a further object of my invention to construct trays whose inlet downcomer has a depending edge which is closest to the seal area at the central region of the inlet downcomer and is furthest from the seal area in the adjacent region of the downcomer.

It is a further object of my invention to construct a tray whose inlet downcomer has in its submerged, spaced auxiliary openings adjacent terminal edge of the downcomer.

It is a further object of my invention to construct a liquid and vapor or gas contact tray having a discharge weir whose height at the central region of the weir is less than in the adjacent region of the weir.

It is a further object of my invention to construct liquid and vapor or gas contact trays comprising flow directing vanes positioned in the seal area of the inlet downcomer adjacent the wall.

DETAILED DESCRIPTION OF THE INVENTION

FIGS. 1 through 11 have been identified above.

This invention includes the use of one or more of the following modifications of the conventional single pass and two pass sieve tray or their equivalent bubble cap and valve trays. The downcomer baffle plate is formed to provide a submerged orifice whose area per linear inch along the width of the downcomer is the least at the center of the downcomer and greatest at the wall of the tower and is of intermediate area per linear inch of the downcomer intermediate portions of the downcomer. This may be accomplished by various configurations such as shown in the drawings. (See FIGS. 12, 22 and 23). In FIG. 23 the terminal edge of the downcomer is in the form of a concave edge of design so that the average height above the seal area in the central region, intermediate region and the wall region will produce a submerged orifice of substantially the same area as in the case of the downcomer with the stepped terminal edge shown above.

Figure 12:
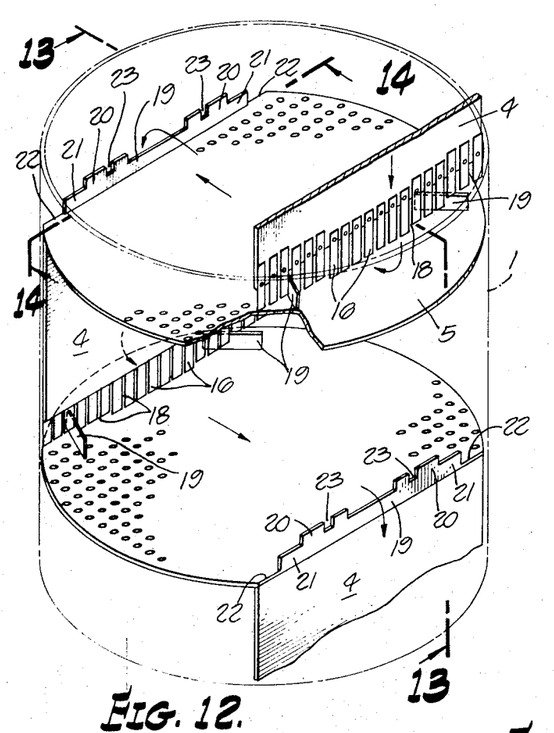
FIG. 12 is a fragmentary view of a preferred form of my invention.
Figure 13:
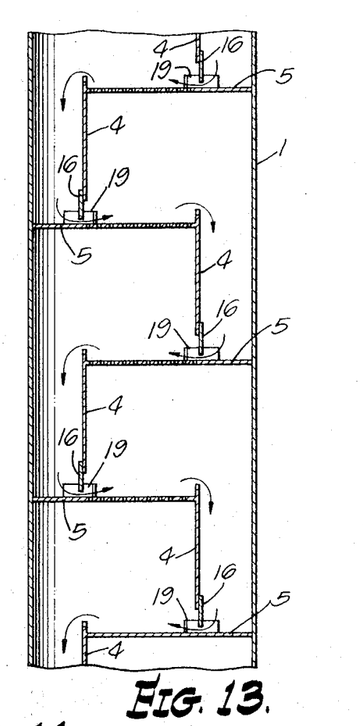
FIG. 13 is a section taken on Line 13—13 of FIG. 12.

As shown in FIG. 12, the downcomer baffle plate 4 terminates above the seal area 5 at a distance somewhat greater than is conventional. Mounted above the baffle plate are a plurality of spaced fingers 16 which may be vertically and horizontally adjusted by means of adjustable mountings 17. By loosening the nuts, the fingers may be adjusted vertically to vary the orifice opening. They may also be adjusted to vary the vertical orifice 18. They may thus be separated by selected distances to produce vertical orifices 18 with ends spaced from the seal area to give submerged orifices of variable vertical dimension for the purposes to be described hereafter.

Thus for example, the slots may be of the order of an one-sixteenth to one-fourth of an inch, for example one-eighth inch in width and the fingers may be of the order of 1 to 2 inches wide, for example 1½ inches and of the length to be submerged in the liquid on the tray.

Extending into the downcomer are vanes 19 positioned in the seal areas and which may, but need not necessarily, extend into the bubbling area.

The equal spacing of the fingers from the seal area in each region may be, for example one-sixteenth to three-sixteenths inches at the central region, two times that at the intermediate region and four times that at the wall region.

Figure 14:
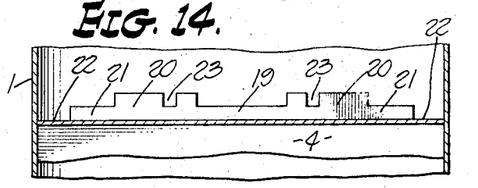
FIG. 14 is a section taken on Line 14—14 of FIG. 12.

Desirably for each downcomer there are two vanes 19 positioned in the downcomer seal area adjacent the wall and extending in a direction substantially parallel to the tangent plane of the wall at the juncture of the downcomer and the wall. The height of the vane may substantially be that of the vertical slots 18 and be positioned in the slot. See FIGS. 19 and 20.

Where a weir is employed, I prefer to form the weir with an area at the central portion thereof as shown on 19 at FIGS. 12 and 14 to have a vertical height above the plate less than the adjacent intermediate Section 20.

The central region of the weir spanning from about 20 to about 35 percent of the width of the outlet, is notched at about one-fourth to three-fourths at the height of the weir, for example one-half of the height of the weir at the intermediate region. At the wall region spanning about 10 to about 12 percent of the width of the outlet, at each end is notched, for example at the height of the central region and as shown in FIG. 12 and FIG. 14 the weir may be entirely removed at about 10 to about 15 percent of the outlet width. This leaves an intermediate region at the weir spanning about 10 to about 30 percent of the outlet width, for example about 20 percent of said width.

The end Section 21 is preferably not higher than the portion 10 and may, in fact, include a section where the weir is omitted, i.e., of zero height. See FIG. 14.

The notch 23 may be provided if desired in the intermediate Section 20.

The average weir height is thus greatest in the intermediate sections and least in the center and towards the end of the weir.

Instead of notching the weir, the weir may be shaped so that its upstanding edge is a continuous line to give weir regions of approximately similar relative height above the tray at the center and ends of the weir as illustrated by the weir of FIGS. 12 and 14.

Figure 21:
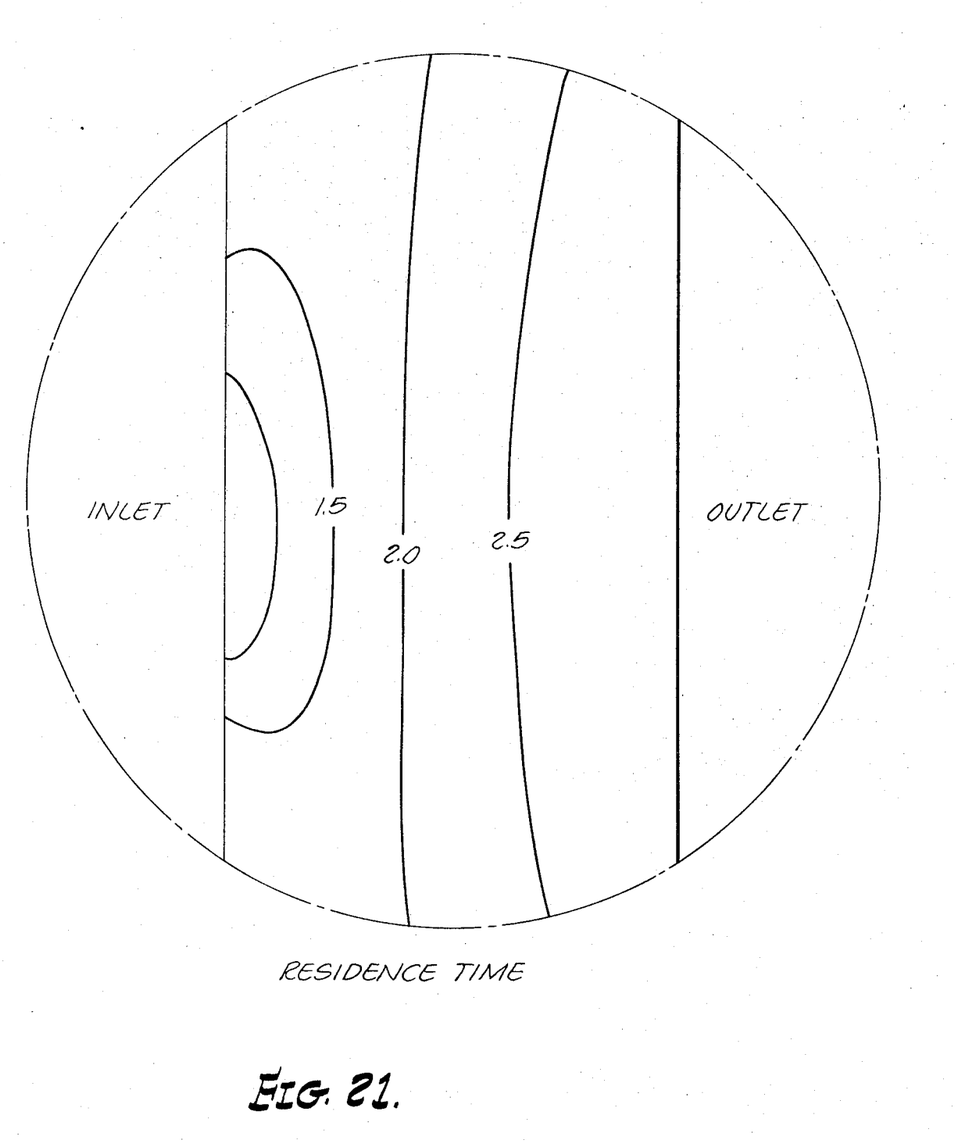
FIG. 21 is a flow pattern of the liquid on a single pass sieve tray shown on FIGS. 11 through 16.

The flow pattern shown in FIG. 21 produced in a sieve tray of the above design is an example of the effect which may be obtained by employing my invention and shall be taken as illustrative and not as a limitation of my invention. The following is an example of the effect which may be obtained by employing my invention and is illustrative of, but not a limitation of, my invention.

Figure 22:
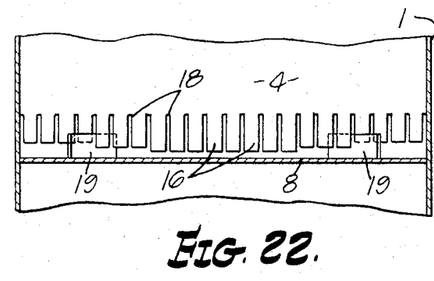
FIG. 22 shows a modification of the downcomer baffle shown in FIG. 12.
Figure 23:
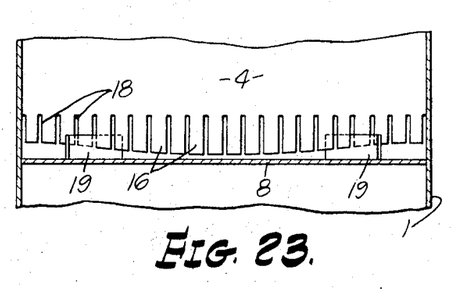
FIG. 23 is a further modification of the downcomer baffle of FIG. 12.

Employing a weir design such as shown in FIG. 12 and a downcomer design such as shown in FIG. 22, in a single-pass sieve tray, a flow pattern such as shown in FIG. 21 was achieved. The downcomer fingers in the tray used in producing the pattern of FIG. 21 were slotted with ⅛ inch slots spaced 1½ inches apart of height sufficient to insure submergence of the slot. The downcomer terminated at the central region one-eighth inch above the seal area, at the intermediate region at one-fourth inch above the seal area and at the wall region one-half inch above the seal area. The weir occupied about 80 percent of the width of the outlet and the notch at the central region occupied about 26 percent of the weir width. The weir ended in an end notch at the wall region which occupied about 13 percent of the width of the weir. The numbers shown on the isochrons indicate relative residence times in seconds. It will be observed that through a major portion of the tray adjacent to the outlet, plug flow has been obtained. A uniform average velocity towards the outlet from the inlet has been obtained at all positions across the plate and at all portions thereof.

The isochronous contour lines are parallel to the inlet.

While I do not wish to be bound by any theory of the action of the tray of my invention to produce the ideal flow conditions of the ideal tray operation, not previously obtained in practical operations in trays employed by the prior art and to the best of applicant's knowledge for the first time obtained by applicant, the functions of applicant's device which is consistent with observed facts are believed to be as follows:

By reducing the vertical height of the submerged orifice in the central region of the orifice a reduction in the translational velocity of the liquid stream in the center of the tray relative to the translational velocity of the liquid stream in the streams along the walls. The wall streams are amplified by reduction in the weir height adjacent the wall.

This is further aided by vanes which direct the streams to exit the submerged orifice in the region adjacent the wall in a direction substantially tangent to the wall. This avoids the expansion of the stream obtained in the single-pass tray or in a double-pass tray in conventional design where the entrance adjacent the wall causes an expansion of the stream or a contraction of the stream where the entrance into a tray is in the center of the tray. See FIG. 9.

The action of the vanes aid in increasing the translational velocity of the liquid moving adjacent the wall. The reduction of the weir height in the central region of the weir reduces the reflection area resulting from the impingement of the center stream against the weir and reduces the deflection of the stream to the right and left of the central region, such as occur in conventional trays. See, for example FIGS. 6 – 10.

The reduction of the weir height at the wall region additionally increases the hydraulic driving force at the wall region to aid in increasing the relative translational velocity of the wall stream relative to the central region stream.

The consequence of the reduction in the reflection area and adjustment of the relative velocity at the wall and the central region reduces the drag of the central stream on the streams in the intermediate area. The increase in the velocity of the stream at the wall co-acting with the central stream cancels the reflection pressure of the stream and this also cancels any vortex action. This causes an expansion of the stream velocities across the tray and aids in the production of plug flow.

The vertical slots which are submerged by the liquid permit the entrance of parallel sheets of liquid through the slots 17 and further minimize and ideally prevent the hydraulic jump which otherwise occurs in conventional downcomers.

Instead of slots I may employ other openings adjacent the end of the downcomer baffle to generate localized streams of liquid into the body of the liquid entering the tray through the submerged orifice in order to overcome the reverse flow toward the orifice which occurs in the liquid downcomer stream of the orifice. This is a phenomenon similar to the so called hydraulic jump.

While the preferred embodiment of my invention to produce a flow of substantial plug type includes the modified downcomer, the modified weir and vanes described above, some advantage in producing more uniform translational velocities and residence time across the trays at various distances from the inlet, as compared with that in conventional trays, is obtained by employing the form of downcomer of my invention described above with or without conventional weirs. The addition of the weir designed as described above further improves the results to cause a further increase in the uniformity of the residence time across the tray at various positions towards the outlet. I prefer, however, to employ, in addition to the modified downcomer and weir, the vanes as described above.

I claim:

1. In a circular liquid and gas or vapor contact tray including an inlet downcomer, an inlet seal area, a bubble area and an outlet downcomer, the improvement comprising said liquid downcomer being spaced from the inlet seal area in the central region of said downcomer for a distance less than the spacing of the inlet downcomer from the seal area in the wall region of said downcomer and auxiliary spaced openings in the downcomer positioned adjacent the terminal edge of the downcomer, said openings being spaced from each other across the width of the downcomer.

2. In the tray of claim 1 in combination with said inlet downcomer, a weir at the outlet of the tray, the height of the weir in the central region and at the wall region being each substantially less than the height of the weir at the intermediate region of the tray.

3. In the tray accordingly to claim 1, vanes positioned at the inlet downcomer seal area and extending into the said seal area and positioned adjacent to the wall, said vanes extending in a direction substantially tangent to the circular wall of the tray at the junction of the wall and the inlet downcomer.

4. A circular liquid and gas or vapor contact tray comprising an inlet downcomer and a seal area associated with said liquid downcomer, said inlet downcomer terminating in an edge spaced from the seal area which in the central region of the downcomer is less than in the adjacent regions and the end of the downcomer being spaced from the seal area at the wall region at a distance substantially greater than the spacing at the end of the downcomer from the seal area at the central region, and the spacing at the end of the downcomer from the seal area at the intermediate region of the downcomer, between said central region and said wall region, being greater than the spacing at the end of the downcomer from the seal area at the central region and less than the spacing at the end of the downcomer from the seal area at the wall region.

5. In the tray of claim 4 a plurality of spaced slots through the end of the inlet downcomer, spaced from each other, along the width of the downcomer.

* * * * *

PO-1050
(5/69)

UNITED STATES PATENT OFFICE
CERTIFICATE OF CORRECTION

Patent No. 3,729,179      Dated April 24, 1973

Inventor(s) GEORGE J. KELLER

It is certified that error appears in the above-identified patent and that said Letters Patent are hereby corrected as shown below:

The term of this patent as of and for the period after April 24, 1973 has been disclaimed.

This certificate supersedes Certificate of Correction issued Feb. 25, 1975.

Signed and Sealed this twenty-eight Day of October 1975

[SEAL]

Attest:

RUTH C. MASON
Attesting Officer

C. MARSHALL DANN
Commissioner of Patents and Trademarks